(12) United States Patent
Sonokawa et al.

(10) Patent No.: US 9,683,451 B2
(45) Date of Patent: Jun. 20, 2017

(54) SEAL ASSEMBLY FOR ARRANGING BETWEEN A STATOR AND A ROTOR

(71) Applicant: United Technologies Corporation, Hartford, CT (US)

(72) Inventors: Masayoshi Sonokawa, West Hartford, CT (US); Russell B. Witlicki, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 73 days.

(21) Appl. No.: 14/759,157

(22) PCT Filed: Jan. 4, 2013

(86) PCT No.: PCT/US2013/020357
§ 371 (c)(1),
(2) Date: Jul. 2, 2015

(87) PCT Pub. No.: WO2014/107161
PCT Pub. Date: Jul. 10, 2014

(65) Prior Publication Data
US 2015/0337674 A1    Nov. 26, 2015

(51) Int. Cl.
*F16J 15/34*    (2006.01)
*F02C 7/28*    (2006.01)
*F01D 11/00*   (2006.01)

(52) U.S. Cl.
CPC ............. *F01D 11/003* (2013.01); *F02C 7/28* (2013.01); *F16J 15/3464* (2013.01); *F16J 15/3472* (2013.01); *F05D 2240/55* (2013.01); *F16J 15/3436* (2013.01); *F16J 15/3452* (2013.01)

(58) Field of Classification Search
CPC ... F01D 11/003; F01D 11/025; F16J 15/3452; F16J 15/3464; F16J 15/3472; F02C 7/28; F05D 2240/55
See application file for complete search history.

(56) References Cited

U.S. PATENT DOCUMENTS

| | | | |
|---|---|---|---|
| 5,174,584 A | 12/1992 | Lahrman | |
| 5,284,347 A * | 2/1994 | Pope | F01D 11/025 277/305 |
| 5,311,734 A * | 5/1994 | Pope | F01D 5/08 415/173.7 |
| 6,196,790 B1 * | 3/2001 | Sheridan | F01D 11/003 415/111 |
| 6,676,369 B2 | 1/2004 | Brauer et al. | |
| 8,215,894 B2 | 7/2012 | Miller et al. | |

(Continued)

*Primary Examiner* — Nicholas L Foster
(74) *Attorney, Agent, or Firm* — O'Shea Getz PC

(57) ABSTRACT

A seal assembly is provided that extends along an axial centerline. The seal assembly includes a seal support, a seal housing, a plurality of torque pins and a plurality of stopper collars. The seal housing includes a plurality of slots arranged circumferentially around the centerline. The slots extend axially through the seal housing, and one or more of the slots has a lateral slot width. The torque pins are connected to the seal support. Each of the torque pins respectively extends axially through a uniquely associated one of the slots to a distal pin end. Each of the stopper collars is uniquely associated with and connected to a respective one of the torque pins at the pin end. One or more of the stopper collars has a lateral collar width that is less than the slot width.

17 Claims, 5 Drawing Sheets

(56) References Cited

U.S. PATENT DOCUMENTS

| | | | |
|---|---|---|---|
| 2007/0096399 A1* | 5/2007 | Miller | F01D 11/00 |
| | | | 277/377 |
| 2007/0108704 A1 | 5/2007 | Craig et al. | |
| 2009/0184475 A1 | 7/2009 | Dobek et al. | |
| 2010/0244385 A1 | 9/2010 | Ullah | |
| 2014/0054862 A1* | 2/2014 | Davis | F01D 11/025 |
| | | | 277/370 |
| 2014/0062026 A1* | 3/2014 | Davis | F01D 11/003 |
| | | | 277/358 |
| 2014/0069100 A1* | 3/2014 | Larson | F16J 15/3464 |
| | | | 60/726 |
| 2016/0025013 A1* | 1/2016 | Miller | F02C 7/28 |
| | | | 60/805 |

\* cited by examiner

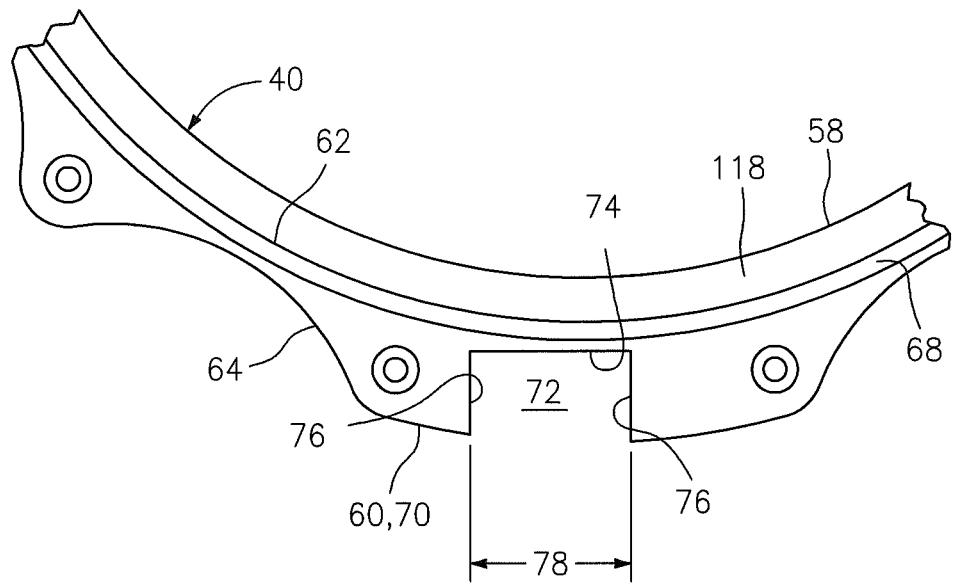
*FIG. 5*
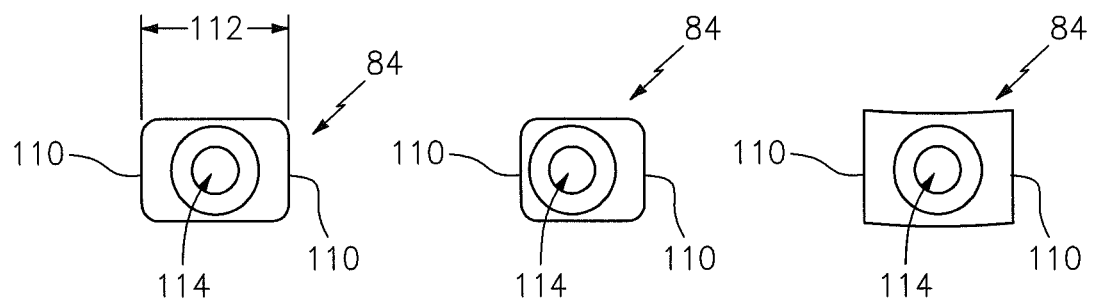
*FIG. 6*   *FIG. 7*   *FIG. 8*

SEAL ASSEMBLY FOR ARRANGING BETWEEN A STATOR AND A ROTOR

This application claims priority to PCT Patent Application No. PCT/US13/20357 filed Jan. 4, 2013, which is hereby incorporated by reference.

BACKGROUND OF THE INVENTION

1. Technical Field

This disclosure relates generally to rotational equipment and, more particularly, to a seal assembly for arranging between a stator and a rotor of, for example, a turbine engine.

2. Background Information

Seal assemblies may be used in rotational equipment to provide a seal between regions of high and low fluid pressure and/or temperature. Seal assemblies may be used, for example, to provide an air and/or liquid seal between a stator and a rotor of a turbine engine, a pump, a compressor, a turbine of, for example, a hydro-electric generator, as well as various other rotational equipment.

A seal assembly for a turbine engine may include a carbon seal that is connected to a seal housing. The seal housing is supported by a seal support with, for example, a plurality of collars installed on respective torque pins. These torque pins are connected onto the seal support, and thus, the seal assembly cannot be removed from seal support without removing the collars from the pins. The seal support is connected to a turbine engine stator with a plurality of fasteners. Coil springs are arranged axially between the seal housing and the seal support to bias the carbon seal axially against a seal landing, which is mounted to a turbine engine shaft. Such a seal assembly, however, may be time consuming for assembly & disassembly and, thus, costly for maintenance. Each of the collars, for example, must be individually removed to disconnect the seal housing from the seal support. These collars may be difficult to install/remove while the assembly is installed within the engine due to space constraints. The seal assembly therefore is typically removed from the engine in order to stall/replace the carbon seal.

There is a need in the art for an improved seal assembly which may be quickly disassembled and reassembled for maintenance.

SUMMARY OF THE DISCLOSURE

According to an aspect of the invention, a seal assembly is provided for a turbine engine. The seal assembly extends along an axial centerline, and includes an annular seal support, an annular seal housing, a plurality of torque pins and a plurality of stopper collars. The seal housing includes a plurality of slots arranged circumferentially around the centerline. The slots extend axially through the seal housing, and one or more (e.g., a first) of the slots has a lateral slot width. The torque pins are connected to the seal support. Each of the torque pins respectively extends axially through a uniquely associated one of the slots to a distal pin end. Each of the stopper collars is uniquely associated with and connected to a respective one of the torque pins at the pin end. One or more (e.g., a first) of the stopper collars has a lateral collar width that is less than the slot width.

According to another aspect of the invention, a seal assembly is provided for arranging between a stator (e.g., a turbine engine stator) and a rotor (e.g., a turbine engine rotor). The seal assembly extends along an axial centerline, and includes a stator seal support, a stator seal housing, a plurality of torque pins, a plurality of stopper collars and a stator seal element connected to the seal housing. The seal housing includes a plurality of slots arranged circumferentially around the centerline. The slots extend axially through the seal housing, and one or more (e.g., a first) of the slots has a lateral width. The torque pins are connected to the seal support. Each of the torque pins respectively extends axially through a uniquely associated one of the slots to a distal pin end. Each of the stopper collars is uniquely associated with and connected to a respective one of the torque pins at the pin end. One or more (e.g., a first) of the stopper collars has a lateral width that is less than the slot width.

A plurality (e.g., each) of the slots may have a respective lateral slot width. A plurality (e.g., each) of the stopper collars may have a respective lateral collar width that is less than the respective slot width.

One or more of the stopper collars are adapted to axially engage the seal housing during a first mode. One or more of the stopper collars are adapted to respectively pass axially through the slots during a second mode.

One or more (e.g., the first) of the collars may extend laterally between opposing collar sides. A bore may extend axially into the first of the collars. The bore may be substantially centered between the collar sides, or arranged adjacent to one of the collar sides. A first of the torque pins may be mated with the bore.

One or more (e.g., the first) of the collars may have a substantially rectangular cross-sectional geometry.

One or more (e.g., the first) of the collars may have a substantially arcuate cross-sectional geometry.

A (e.g., annular stator) seal element may be connected to the seal housing. A (e.g., annular rotor) second seal element may axially engage the seal element to form a seal therebetween. The second seal element may be operable to rotate about the centerline relative to the seal element. The seal element may be a face seal, and the second seal element may be a face seal land.

A guide sleeve may laterally engage a side of the first of the slots. A first of the torque pins may extend axially through the guide sleeve.

A plurality of springs may be arranged circumferentially around the centerline, and extend axially between the seal support and the seal housing. The springs may (e.g., axially) bias the stator seal element against the rotor seal element.

The foregoing features and the operation of the invention will become more apparent in light of the following description and the accompanying drawings.

BRIEF DESCRIPTION OF THE DRAWINGS

FIG. 5 is an illustration of a portion of a seal housing for the seal assembly of FIG. 2;

FIG. 6 is an illustration of a stopper collar for the seal assembly of FIG. 2;

FIG. 7 is an illustration of another stopper collar for the seal assembly of FIG. 2; and FIG. 8 is an illustration of still another stopper collar for the seal assembly of FIG. 2.

DETAILED DESCRIPTION OF THE INVENTION

Figure 1:
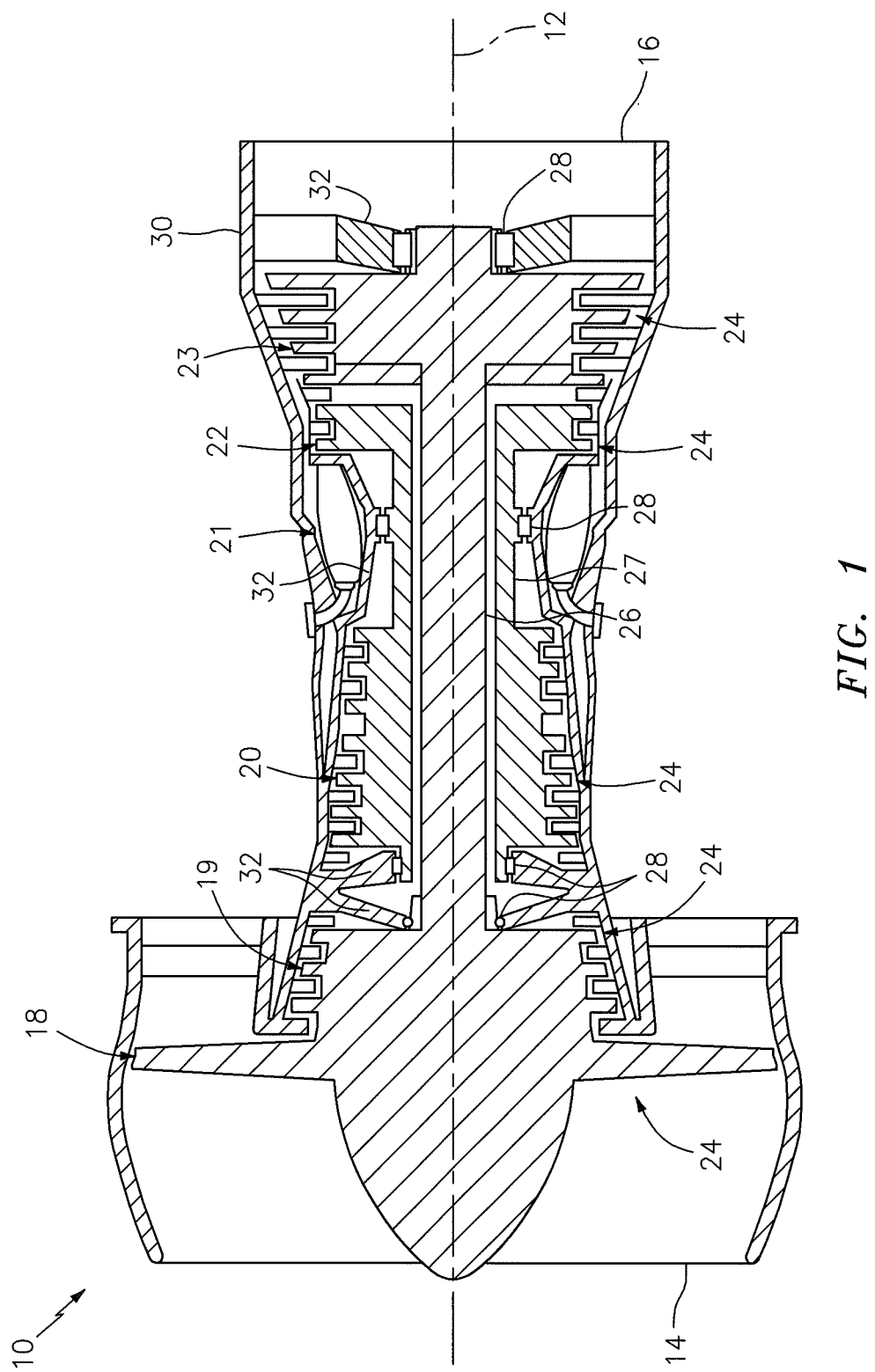
FIG. 1 is a sectional illustration of a turbine engine.

FIG. 1 illustrates a turbine engine 10 that extends along an axial centerline 12 between a forward airflow inlet 14 and an aft airflow exhaust 16. The engine 10 includes a plurality of engine sections such as, for example, a fan section 18, low and high pressure compressor sections 19 and 20, a combustor section 21, and high and low pressure turbine sections 22 and 23. Each of the engine sections 18-20, 22 and 23 includes a rotor assembly, which includes one or more rotor stages 24.

Each of the rotor stages 24 includes a plurality of rotor blades arranged circumferentially around and connected to a rotor disk. The rotor stages 24 of the engine sections 18, 19 and 23 may be connected to a first (e.g., low speed) shaft 26. The rotor stages 24 of the engine sections 20 and 22 may be connected to a second (e.g., high speed) shaft 27. The first and the second shafts 26 and 27 are rotatably supported by a plurality of bearings 28. Each of the bearings 28 is connected to an engine case 30 by at least one stator 32 such as, for example, an annular support strut.

Figure 2:
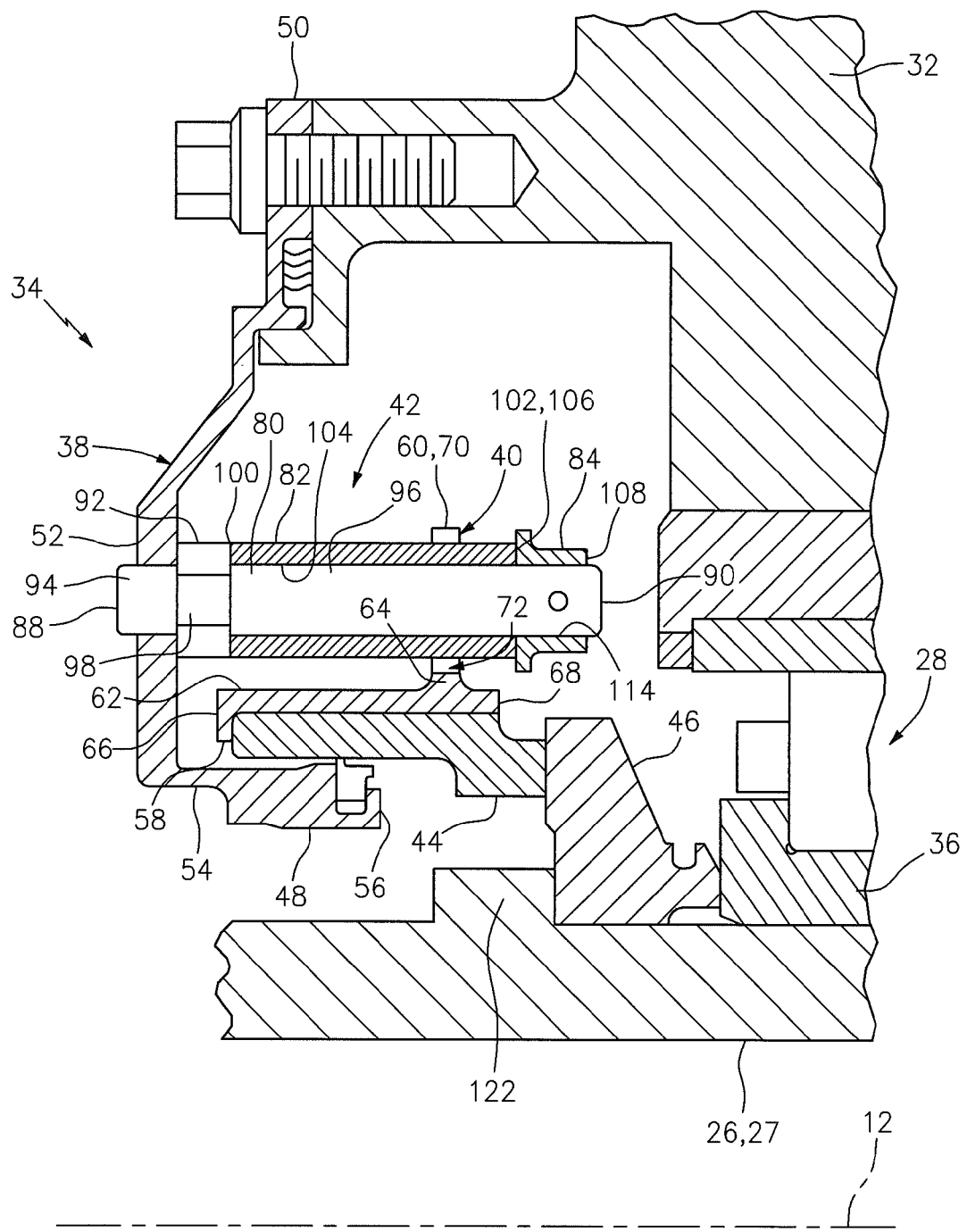
FIG. 2 is a partial sectional illustration of a seal assembly for the engine of FIG. 1 at a first circumferential location.
Figure 3:
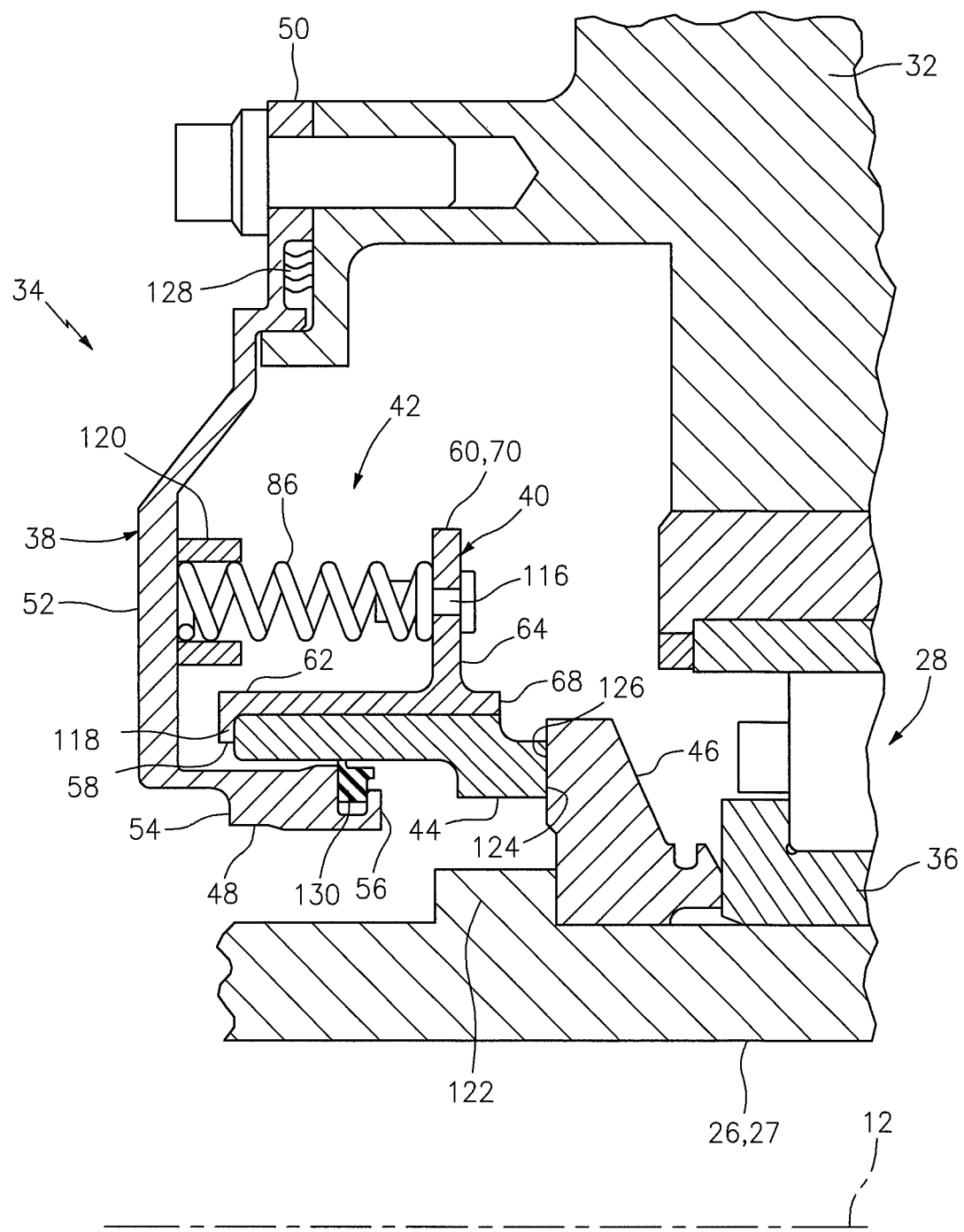
FIG. 3 is a partial sectional illustration of the seal assembly at a second circumferential location.

FIGS. 2 and 3 illustrate a seal assembly 34 for sealing a gap between one of the stators 32 and a rotor 36 such as, for example, an inner race of a respective one of the bearings 28. The seal assembly 34 includes an annular stator seal support 38, an annular stator seal housing 40, a housing support assembly 42, an annular stator seal element 44 (e.g., a carbon face seal), and an annular rotor seal element 46 (e.g., a face seal landing).

The seal support 38 extends radially between a radial inner support side 48 and a radial outer support side 50. The seal support 38 embodiment of FIGS. 2 and 3 includes an annular first support segment 52 and an annular second support segment 54. The first support segment 52 extends radially from the second support segment 54 to the outer support side 50. The second support segment 54 is arranged at (e.g., adjacent or proximate to) the inner support side 48. The second support segment 54 extends axially from the first support segment 52 to a distal segment end 56.

Figure 4:
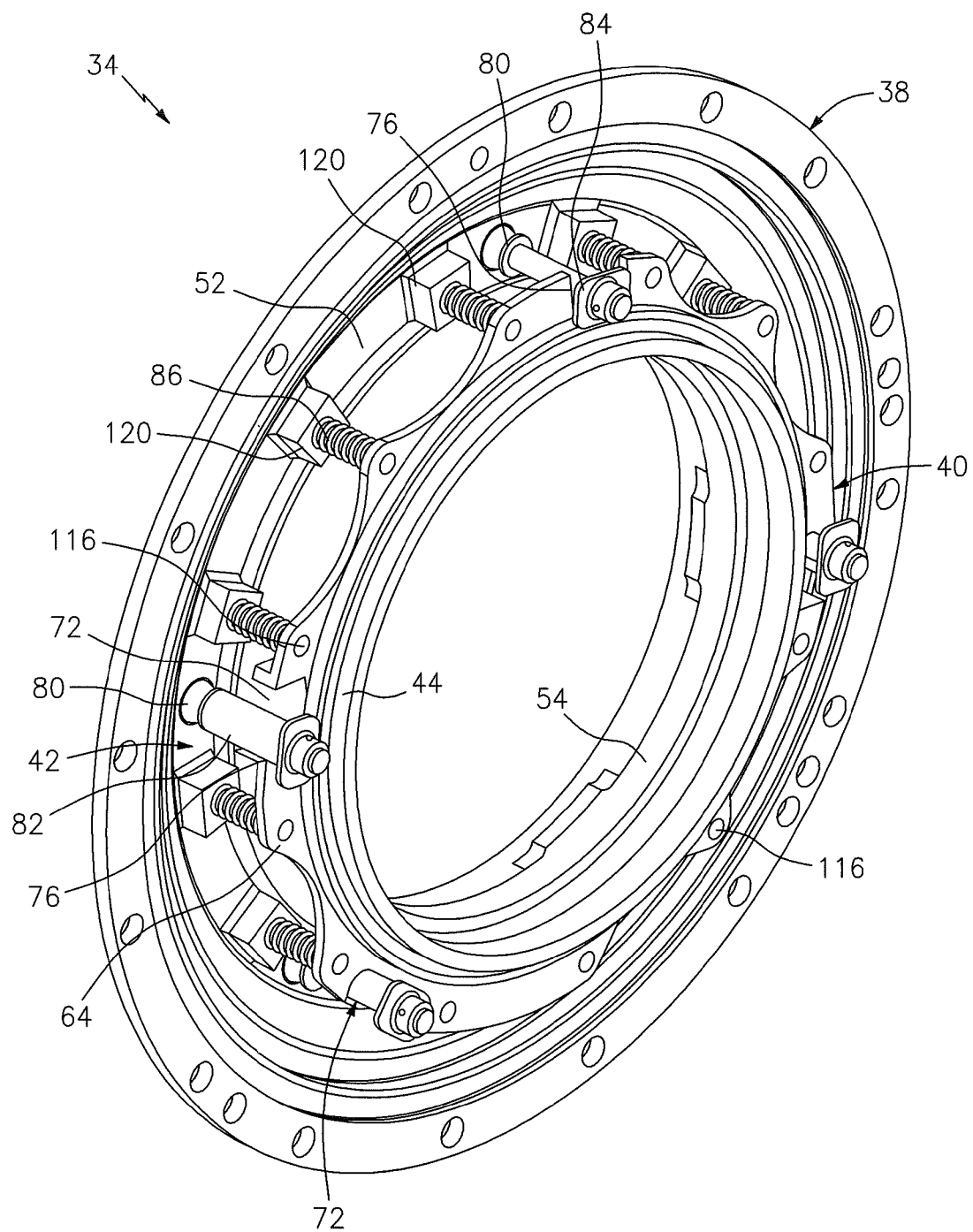
FIG. 4 is a perspective illustration of a portion of the seal assembly of FIG. 2.

The seal housing 40 extends radially between a radial inner housing side 58 and a radial outer housing side 60. The seal housing 40 embodiment of FIGS. 2 and 3 includes an annular housing sleeve 62 and a (e.g., segmented annular) housing flange 64. The housing sleeve 62 is arranged at the inner housing side 58. The housing sleeve 62 extends axially between a first housing end 66 and a second housing end 68. The housing flange 64 is arranged at the second housing side 68. The housing flange 64 extends radially out from the housing sleeve 62 to a distal flange end 70, for example, at the outer housing side 60. Referring to FIG. 4, the housing flange 64 includes a plurality of slots 72 arranged circumferentially around the centerline. The slots 72 extend axially through the housing flange 64. Referring to FIG. 5, each of the slots 72 may extend radially into the housing flange 64 from the distal flange end 70 to a slot end 74. Each of the slots 72 extends laterally (e.g., circumferentially or tangentially) between opposing slot sides 76, which defines a respective lateral slot width 78 therebetween.

Referring to FIG. 4, the housing support assembly 42 includes a plurality of torque pins 80, a plurality of guide sleeves 82, a plurality of stopper collars 84, and a plurality of springs 86 (e.g., coil springs). Referring to FIG. 2, each of the torque pins 80 extends axially between a first pin end 88 and a second pin end 90. The torque pin 80 embodiment of FIG. 2 includes an intermediate segment 92 arranged axially between a (e.g., threaded) first end segment 94 and a (e.g., non-threaded) second end segment 96. The intermediate segment 92 may include one or more torquing features 98 such as, for example, a plurality of flats arranged circumferentially around the segment 92 to receive a drive head of a wrench or a ratchet. The first end segment 94 extends axially from the intermediate segment 92 to the first pin end 88. The second end segment 96 extends axially from the intermediate segment 92 to the second pin end 90.

Each of the guide sleeves 82 extends axially between a first sleeve end 100 and a second sleeve end 102. Each of the guide sleeves 82 includes a bore 104 that extends axially through the sleeve 82 between the first and the second sleeve ends 100 and 102.

Each of the stopper collars 84 extends axially between a first collar end 106 and a second collar end 108. Referring to FIG. 6, each of the stopper collars 84 extends laterally between opposing collar sides 110, which defines a respective lateral collar width 112 therebetween. The collar width 112 may be less than or substantially equal to the slot width 78 (see FIG. 5). Each of the stopper collars 84 includes a bore 114 that is, for example, substantially centered between the collar sides 110. Referring to FIG. 2, the bore 114 extends axially into (e.g., through) the collar 84 from the first collar end 106 towards (e.g., to) the second collar end 108.

Referring to FIG. 4, the torque pins 80 and the springs 86 are arranged circumferentially around the centerline. One or more of the springs 86 may be respectively interposed between adjacent torque pins 80. Referring now to FIG. 2, the torque pins 80 are connected to the first support segment 52. The first end segment 94 of each of the torque pins 80, for example, is mated with (e.g., threaded into) a respective (e.g., threaded) aperture in the first support segment 52. The intermediate segment 92 of each of the torque pins 80 may engage (e.g., contact) the first support segment 52. The second end segments 96 of a plurality of the torque pins 80 are respectively mated with (e.g., extend into or through) the bores 104 of the guide sleeves 82. Each of the second end segments 96 is mated with the bore 114 of a respective one of the stopper collars 84. Each of the stopper collars 84 is connected to the torque pin 80, for example, at the respective second pin end 90 with a fastener (e.g., a cotter pin). Referring to FIG. 3, each of the springs 86 is (e.g., removably) connected to the seal housing 40. An end of each of the springs 86, for example, is mated with (e.g., slid onto) a respective mounting nub 116, which is connected (e.g., riveted or otherwise fastened) to the housing flange 64.

The stator seal element 44 is connected to the seal housing 40. The stator seal element 44, for example, is mated with (e.g., seated and/or press fit within) the housing sleeve 62 and abutted against a retainer flange 118 at the first housing end 58. Referring to FIG. 4, the seal housing 40 is removably connected to the seal support 38. The seal housing 40 and the stator seal element 44, for example, are axially mated with (e.g., slid onto) the second support segment 54 such that the stopper collars 84 respectively pass axially through the slots 72. Free ends of the springs 86 may be respectively mated with spring seats 120 on the first support segment 52. The seal housing 40 is twisted about the centerline, for example, until the guides sleeves 82 laterally engage the slot sides 76. In this configuration, a portion of each of the stopper collars 84 may laterally overhang a respective portion of the housing flange 64 adjacent the respective slot side 76. The stopper collars 84 therefore may axially engage and retain the seal housing 40 where, for example, the springs 86 push the seal housing 40 axially away from the seal support 38.

Referring to FIG. 3, the rotor seal element 46 is mounted onto the shaft 26, 27, for example, axially between a shaft shoulder 122 and the rotor 36. The first support segment 52 is connected to the stator 32 with, for example, a plurality of fasteners (e.g., bolts). The springs 86 push the seal housing 40 axially away from the seal support 38 and, thus, bias the stator seal element 44 axially against the rotor seal element 46. A radial seal surface 124 of the stator seal element 44, for example, axially engages a radial seal surface 126 of the rotor seal element 46, thereby forming a rotary gas and/or liquid seal therebetween.

In some embodiments, an annular seal element 128 may be arranged axially between the first support segment 52 and the stator 32 to reduce or prevent fluid leakage therebetween. An annular seal element 130 may also or alternatively be arranged radially between the second support segment 54 and the stator seal element 44 to reduce or prevent fluid leakage therebetween.

In some embodiments, for example as illustrated in FIG. 7, the bore 114 of the stopper collar 84 may be arranged adjacent to one of the collar sides 110. In some embodiments, for example as illustrated in FIGS. 6 and 7, the stopper collar 84 may have a substantially rectangular cross-sectional geometry. In other embodiments, for example as illustrated in FIG. 8, the stopper collar 84 may have a substantially arcuate cross-sectional geometry. The present invention, of course, is not limited to any particular stopper collar geometry or configuration.

In some embodiments, a guide sleeve 82 may be mounted onto each of the torque pins 80. In other embodiments, the guide sleeves 82 may be omitted and the torque pins 80 may directly engage the housing flange 64.

In some embodiments, the turbine engine 10 may include a plurality of the seal assemblies 34. In this manner, one or more turbine engine rotors may each be arranged axially between a respective pair of the seal assemblies 34.

A person of skill in the art will recognize the seal assembly may include various seal element types and configurations other than those described above and illustrated in the drawings. The present invention therefore is not limited to any particular stator and/or rotor seal element types or configurations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A seal assembly for a turbine engine, the seal assembly extending along an axial centerline and comprising:
    an annular seal support;
    an annular seal housing including a plurality of slots arranged circumferentially around the centerline, wherein the slots extend axially through the seal housing, and a first of the slots has a lateral slot width;
    a plurality of torque pins connected to the seal support, each respectively extending axially through a uniquely associated one of the plurality of slots to a distal pin end;
    a plurality of stopper collars, each uniquely associated with and connected to a respective one of the plurality of torque pins at the distal pin end, wherein a first of the stopper collars has a lateral collar width that is less than the lateral slot width;
    a guide sleeve that laterally engages a side of the first of the slots, wherein a first of the torque pins extends axially through the guide sleeve, and wherein the guide sleeve has a lateral sleeve width that is less than the lateral collar width; and
    wherein one or more of the stopper collars are adapted to axially engage the seal housing during a first mode, and respectively pass axially through the slots during a second mode.

2. The seal assembly of claim 1, wherein each of the slots has a respective lateral slot width, and each of the stopper collars has a respective lateral collar width that is less than the respective lateral slot width.

3. The seal assembly of claim 1, wherein
    the first of the collars extends laterally between opposing collar sides;
    a bore extends axially into the first of the collars, and is substantially centered between the collar sides; and
    a first of the torque pins is mated with the bore.

4. The seal assembly of claim 1, wherein the first of the collars has a substantially rectangular cross-sectional geometry.

5. The seal assembly of claim 1, wherein the first of the collars has a substantially arcuate cross-sectional geometry.

6. The seal assembly of claim 1, further comprising an annular seal element connected to the seal housing.

7. The seal assembly of claim 6, further comprising an annular second seal element that axially engages the seal element to form a seal therebetween, wherein the second seal element rotates about the centerline relative to the seal element.

8. The seal assembly of claim 7, wherein the seal element comprises a face seal, and the second seal element comprises a face seal land.

9. The seal assembly of claim 1, further comprising a plurality of springs that are arranged circumferentially around the centerline, and extend axially between the seal support and the seal housing.

10. A seal assembly for arranging between a stator and a rotor, the assembly extending along an axial centerline and comprising:
    a stator seal support;
    a stator seal housing including a plurality of slots arranged circumferentially around the centerline, wherein the slots extend axially through the seal housing, and a first of the slots has a lateral width;
    a plurality of torque pins connected to the seal support, each respectively extending axially through a uniquely associated one of the plurality of slots to a distal pin end;
    a plurality of stopper collars, each uniquely associated with and connected to a respective one of the plurality of torque pins at the distal pin end, wherein a first of the stopper collars has a lateral width that is less than the slot lateral width of the first of the slots;
    a guide sleeve that laterally engages a side of the first of the slots, wherein a first of the torque pins extends axially through the guide sleeve, and wherein a portion of the first of the stopper collars projects laterally out from the guide sleeve; and a stator seal element connected to the seal housing, wherein one or more of the stopper collars are adapted to axially engage the seal housing during a first mode, and respectively pass axially through the slots during a second mode.

11. The seal assembly of claim 10, further comprising a rotor seal element that axially engages the stator seal element.

12. The seal assembly of claim 11, wherein the stator seal element comprises a face seal, and the rotor seal element comprises a face seal land.

13. The seal assembly of claim 10, wherein the first of the collars extends laterally between opposing collar sides;

a bore extends axially into the first of the collars, and is substantially centered between the collar sides; and a first of the torque pins is mated with the bore.

14. The seal assembly of claim 10, wherein the first of the collars has a substantially rectangular cross-sectional geometry.

15. The seal assembly of claim 10, wherein the first of the collars has a substantially arcuate cross-sectional geometry.

16. The seal assembly of claim 10, further comprising a plurality of springs that are arranged circumferentially around the centerline and axially between the seal support and the seal housing, wherein the springs bias the stator seal element against the rotor seal element.

17. The seal assembly of claim 10, wherein the portion of the first of the stopper collars is adapted to laterally overlap and axially engage a portion of the stator seal housing.

\* \* \* \* \*